INVENTOR.
HOMER J. SHAFER
BY Ely, Frye & Hamilton
ATTORNEYS

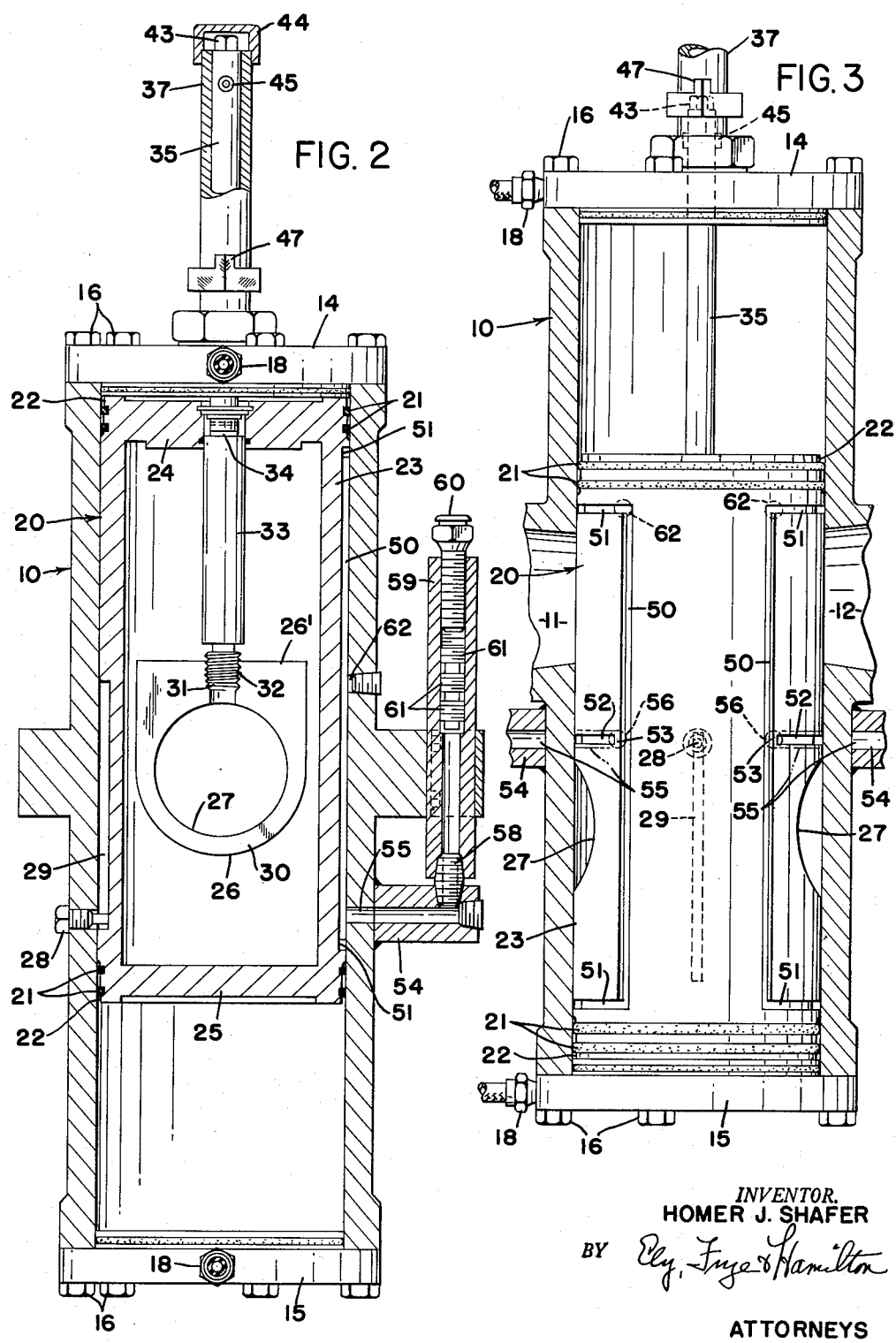

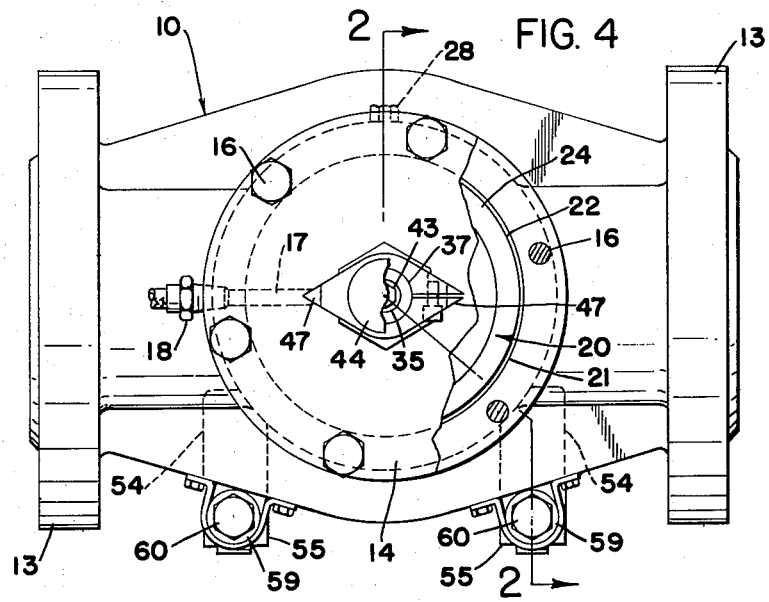
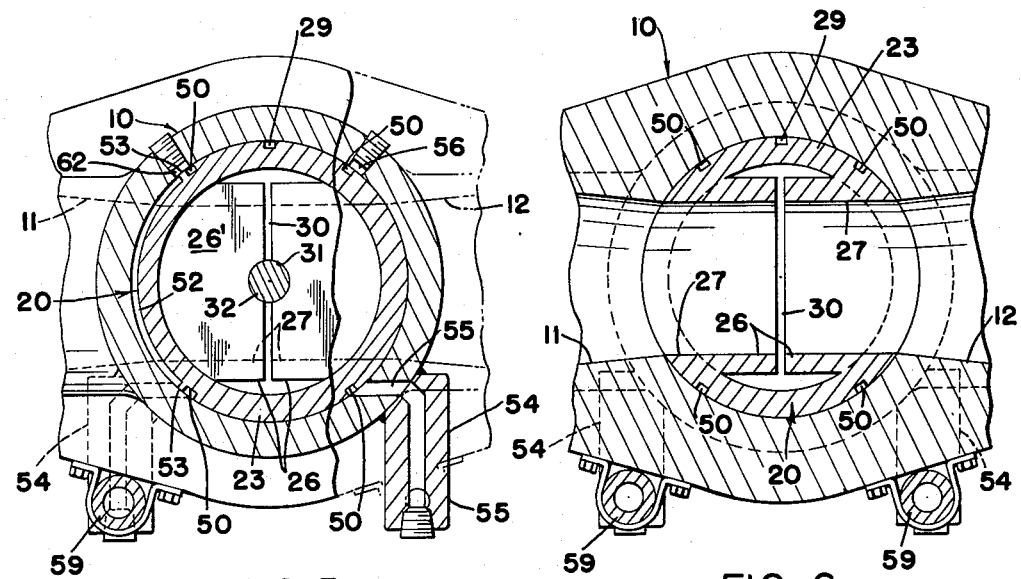

Oct. 17, 1961 H. J. SHAFER 3,004,552
PISTON VALVE CONSTRUCTION
Filed Aug. 10, 1959 4 Sheets-Sheet 4
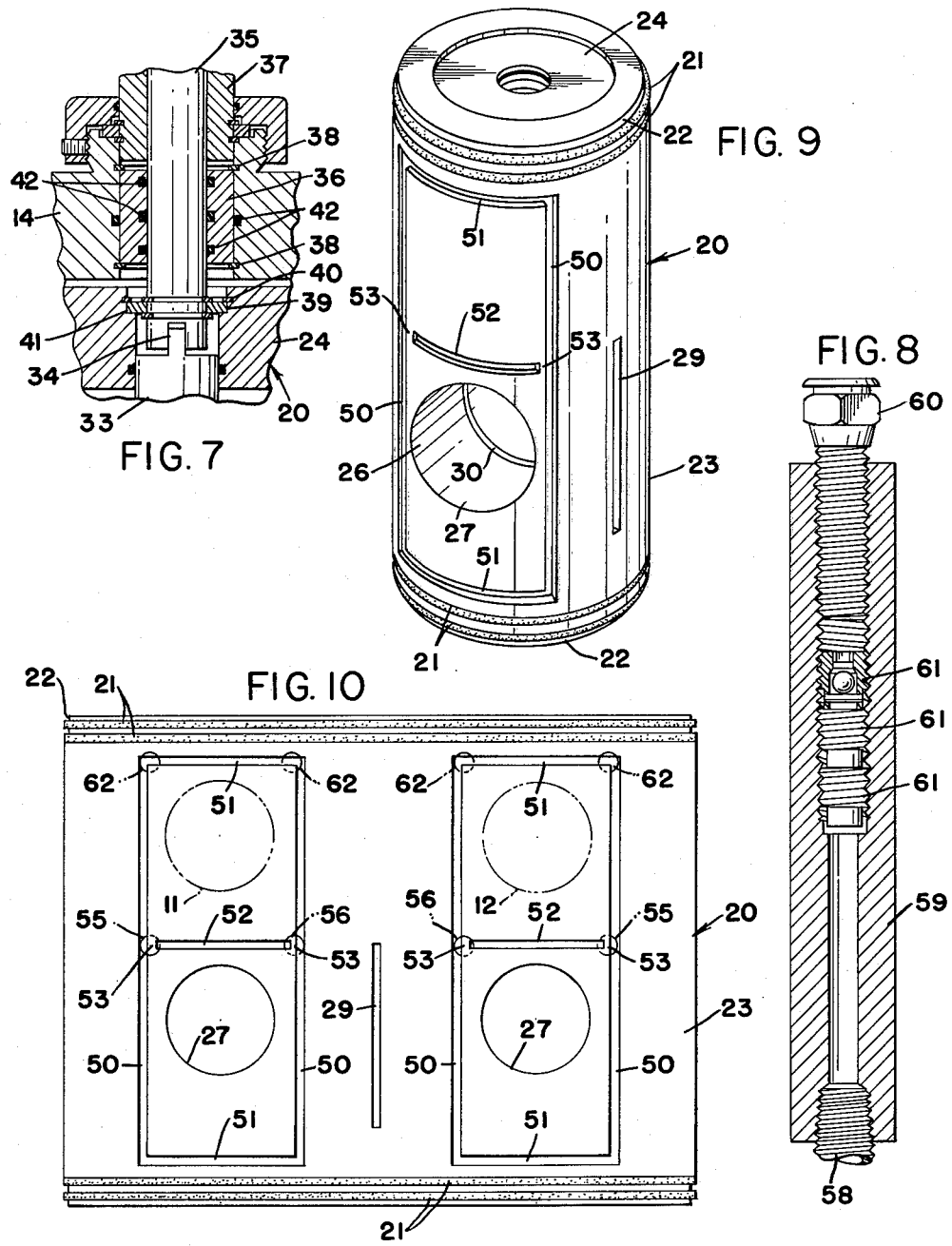
*INVENTOR.*
HOMER J. SHAFER
BY Ely, Frye & Hamilton
ATTORNEYS

United States Patent Office 3,004,552
Patented Oct. 17, 1961

3,004,552
PISTON VALVE CONSTRUCTION
Homer J. Shafer, P.O. Box 83, Mansfield, Ohio
Filed Aug. 10, 1959, Ser. No. 832,595
8 Claims. (Cl. 137—246.22)

The invention relates to piston type valves for pipe lines carrying high pressures, and more particularly to a novel piston construction having improved sealing characteristics.

In my prior co-pending application Serial No. 776,860, filed November 28, 1958, I disclosed a piston valve having complementary lubricant sealing grooves in the piston and body surrounding the valve ports therein in the closed position of the valve. It is difficult and expensive to machine lubricant grooves on the interior of the body of a piston valve, and it is an object of the present invention to provide an improved piston valve construction in which all of the sealing grooves are in the piston.

Said application Serial No. 776,860 also disclosed slitting the piston into two halves intermediate its ends transversely of its valve port and providing means to wedge the piston halves apart, to compensate for distortion of the body resulting from expansion or contraction of the pipe line in which the valve is connected. While such construction permits closer machining tolerances between the piston and body, the slit in the piston permits foreign matter flowing through the piston port to flow through the slit into the clearance space between the piston and body, causing scoring of the walls. Moreover, the outer edges of the saw cut or slit must be ground to prevent scoring.

Accordingly, another object of the present invention is to provide an improved piston construction for compensating for distortion of the body without allowing foreign matter to flow from the piston port into the clearance space between the piston and body, and without providing exterior saw cut edges requiring grinding.

A further object is to provide an improved piston construction for utilizing trapped pressure within the piston to compensate for distortion due to line pressure on the exterior of the piston in closed position, and thereby conform the exhaust side of the piston to the body.

Other objects include the provision of a piston valve construction having an improved lubricant sealing groove arrangement and improved means for feeding lubricant to said grooves.

These objects, and other which will appear from the following description, are accomplished by the improvements comprising the present invention. A preferred embodiment of the invention is disclosed by a way of example in the accompanying drawings and description, and various modifications and changes in details are contemplated within the scope of the appended claims defining the invention.

In the drawings:

FIG. 2 is a sectional view on line 2–2 of FIGS. 1 and 4.

FIG. 3 is a vertical sectional view showing the piston in elevation and in closed position.

FIG. 4 is a top plan view, partly broken away.

FIGS. 5 and 6 are plan sectional views on 5–5 and 6–6 of FIG. 4.

FIG. 7 is an enlarged fragmentary sectional view similar to the upper portion of FIG. 1.

FIG. 8 is an enlarged fragmentary sectional view of the lubricant supply device shown in elevation in FIG. 1.

FIG. 9 is a detached perspective view of the piston.

FIG. 10 is a schematic developed view of the exterior of the piston.

Figure 1:
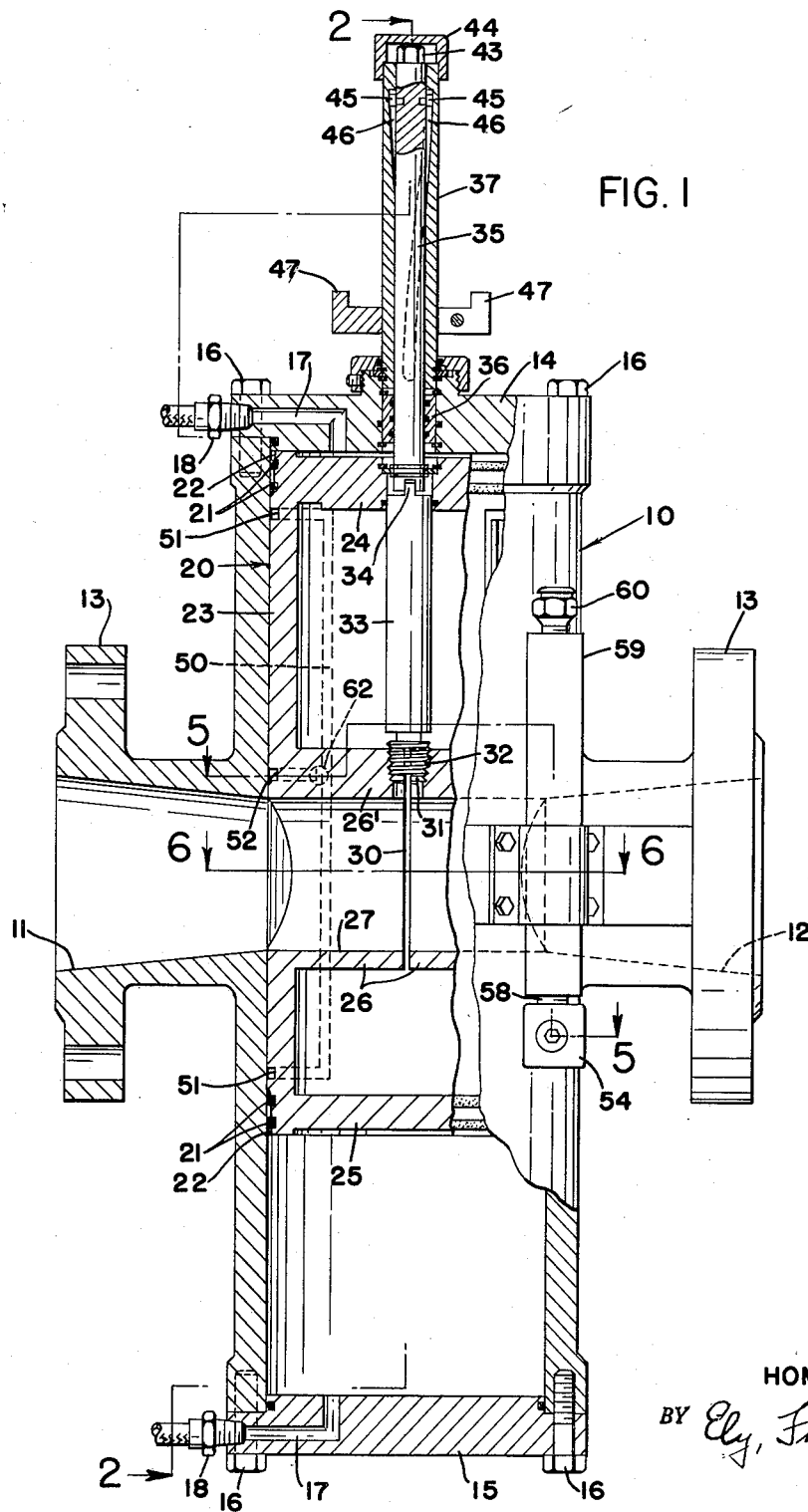
FIG. 1 is a vertical sectional view, partly in elevation, of the improved piston valve in open position.

The body of the improved piston valve is indicated generally at 10, and is preferably cylindrical in form having opposed registering inlet and outlet flow ports 11 and 12, respectively. The ports 11 and 12 have the same diameter at their inner ends as the flow port through the piston, and are preferably outwardly divergent and have the same diameter at their outer ends as the inner diameter of the pipe line in which the valve is connected. Flanges 13 are provided on the body at the outer ends of ports 11 and 12 to make the usual flanged connections with the pipe line.

The body 10 has removable end plates 14 and 15 secured thereto by screw studs 16, and each plate has a port 17 therein fitted with a fluid pressure connection 18 for supplying and exhausting perssure fluid alternately to opposite ends of the body to reciprocate the piston therein to open and closed positions.

The piston is indicated as a whole at 20, and is provided at each end with a pair of O-rings 21, the piston having reduced diameter portions 22 extending from the ends inwardly beyond the inner ring. The outer ring 21 of each pair functions as a wiper ring and the inner ring functions as a sealing ring. The reduced diameter portions 22 relieve pressure build-up between the rings, and thus reduce wear on the sealing rings.

The piston 20 is hollow and preferably has a cylindrical wall 23 and integral end walls 24 and 25 forming an internal cavity. Between the end walls is an integral annular wall 26 extending transversely of the piston forming a flow port 27 therethrough which, in the full open position of FIG. 1, registers with the inner ends of body ports 11 and 12 and is the same diameter throughout. The port 27 is substantially nearer to the bottom end of the piston than to the top, and the annular wall 26 is thickened on the top side of port 27 as shown at 26', for a purpose to be described.

For preventing axial rotation of the piston 20 as it reciprocates, a screw stud 28 is provided extending through the body 10, preferably at 90° to the ports 11 and 12, and a vertical groove 29 in the exterior of piston wall 23 slidably receives the stud (FIG. 2) and allows vertical movement of the piston from open to closed position without rotating.

The annular wall 26 is divided or split into two parts by a vertical slit 30 in the plane of the longitudinal axis of the piston and extending transversely of the piston port 27. In the thickened wall 26' the slit 30 passes through a tapered tapped hole 31 which preferably has a tapered expansion plug 32 screwed therein for wedging the two parts of annular wall 26 apart. The screw plug 32 has an axial extension 33 to the upper end wall 14, and has a splined connection at 34 (FIG. 7) with a stem 35 extending slidably through a bearing sleeve 36 into an indicator tube 37. The bearing sleeve 36 is preferably held in the end wall 14 by snap rings 38, and the stem 35 has a collar 39 thereon which is engaged by a snap ring 40 and shoulder 41 in the top wall 24 of the piston to secure the stem therein. O-rings 42 provide seals between the stem and sleeve 36 and between sleeve 36 and end wall 14.

The outer end of stem 35 is provided wrench lands 43 for turning the stem and screw plug 33, and the outer end of the indicator tube has a removable cap 44 to make the end of the stem accessible. Studs 45 on the stem are slidably engaged in spiral cam slots 46 in the tube 37, for rotating the indicator tube and the indicator point 47 thereon 90° as the piston moves from open to closed positions and vice versa.

One purpose of the slit 30 is to compensate for or relieve lateral pressure on the piston due to distortion of the body caused by expansion or contraction of the pipe line connected thereto. By rotating the stem 35 to tighten the plug 32 in hole 31 the two parts of annular wall 24 may be wedged apart slightly to decrease the working tolerance and insure a tighter seal between the piston and body in closed position. By reversely rotating the stem the working tolerance can be slightly increased to insure free movement of the piston between open and closed position.

Another purpose of the slit 30 is to compensate for distortion of the piston in closed position due to line pressure on one side. In open position of the piston, the line pressure flows through slit 30 into the internal cavity of the piston, and when the piston is moved to closed position, pressure fluid at line pressure is trapped in the internal cavity of the piston. Moreover, in the closed piston of FIG. 3, the line pressure on the pressure side of the piston seeps down over the wear area of the piston between its port 27 and the pressure port 11 in the body, and flows through the slit 30 into the internal cavity, replenishing any lost pressure of the entrapped fluid.

In the closed position of the piston, the internal line pressure trapped within the piston compensates for or controls the distorting effect of the external line pressure on the piston as the pressure in inlet port 11 forces the piston bodily against the exhaust port 12, with the result that the piston wall on the exhaust side conforms to the contour of the body around the port 12 and improves the metal-to-metal contact between the piston and body around port 12. The wedge plug 32 can be adjusted to cooperate with the internal pressure in improving the continuity of this contact.

Because the slit 30 is entirely within the piston, any foreign matter passing into the slit from the pressure fluid flowing through piston port 27 is trapped within the piston and can not find its way out between the piston and body to cause scoring of the relatively slidable surfaces thereof, nor is there any requirement to grind or smooth the exterior edges of the slit, as is the case where the slit passes entirely through the walls of the piston.

The height of piston 20 is proportioned to the height of the body 10 between the port openings 11 and 12 and the bottom of the cylinder, so that the O-rings 21 do not cross the ports, and so that the O-rings never pass over the wear area of the body. Referring to FIG. 3, the wear area is that portion of the inner surface of the body extending between the body ports 11 and 12 and the piston port 27 in its closed position, more particularly such area on the exhaust side of the piston because of line pressure acting on the inlet side. The piston port 27 is so located relative to end walls 24 and 25 that in closed position the height of the wear area, or in other words the overlap of the piston beyond the body ports, is a substantial distance in order to increase the effectiveness of the seal between the piston and the body around the body port 12.

As the piston is moved between open and closed positions, the wear area on the exhaust side of the body is subjected to the wearing action of the pressure fluid passing through the partly opened port 27 and striking the body at the outlet end of said port, so that the wearing area becomes scored or abraded. Hence, if the O-rings traversed this surface they would become damaged to detract from the effectiveness of their seals. Because of the distance between the bottom of piston 20 and its port 27 the lower O-rings 21 never pass over the wear area of the body in moving from open to closed position.

Referring to FIGS. 2 and 3, when the piston valve is assembled, the top and bottom plates 14 and 15 are removed, and the piston 20 inserted into the top of the body with the upper O-rings 21 in place and the lower rings removed. The piston is then pushed downwardly to project its lower end sufficiently to apply the lower rings thereto, which may be done without passing the upper rings over the ports 11 and 12 due to the height of the piston above the ports in normally closed position.

The piston is then raised to retract its lower end within the body, and the stem connected and the upper and lower plates 14 and 15 and the indicator assembly applied.

Duplicate systems of lubricant sealing grooves are provided on the inlet and exhaust sides of the piston so that only one system need be described.

Referring particularly to FIGS. 9 and 10, the exterior surface of piston 20 has a lubricant groove surrounding each end of port 27 and defining a closed, preferably rectangular path. The groove comprises laterally spaced longitudinal portions 50 with connecting lateral portions 51 at the ends. Above and adjacent to the port 27 is another lateral or cross groove 52 having its ends disconnected from said longitudinal portions 50 by narrow lands 53 on the surface of the piston.

When the piston 20 is in closed position, as shown in FIG. 3, the cross grooves 52 are in register with the lubricant supply tubes 54, which are connected to the groove 52 by holes or ports 55 through the body 10. The exact positions of the holes 55 is shown by the chain line circles in FIG. 10, and it will be seen that said holes form connections between one end of each cross groove 52 and a longitudinal groove 50. The other ends of grooves 52 are simultaneously connected to the opposite longitudinal groove by circular ports or recesses 56 formed on the inner wall of the body and shown in dotted lines in FIG. 3. Thus, the cross groove 52, lower groove 51 and longitudinal grooves 50 form a continuous rectangular groove around each end of port 27.

The lubricant supply tubes 54 are connected by nipples 58 to vertical feed tubes 59 having lubricant fittings 60 at their top ends and a series of ball check valves 61 therein to prevent back flow of lubricant.

When the piston is in closed position, the relative positions of the body ports 11 and 12 are indicated in chain lines in FIG. 10, and when the piston is raised to full open position the piston ports 27 are in register with said body ports. In this position the cross grooves 52 occupy the former position of the upper cross groove 51, and the ends of the cross grooves 52 are connected to the longitudinal grooves 50 by circular ports or recesses 62 similar to the recesses 56, one of the recesses 62 being shown in cross section in FIG. 2. Thus, the cross groove 52, lower groove 51 and longitudinal grooves 50 form a continuous rectangular groove around each end of port 27 and the registering ports 11 and 12 in the open position of the piston.

The present arrangement of lubricant sealing grooves provides duplicate sets of grooves on the inlet and outlet sides of the piston, with a separate source of lubricant for each set so that lubricant can be supplied selectively to one side or the other. In the closed position of the piston shown in FIG. 3, each end of the piston port 27 is surrounded by a continuous groove following a closed rectangular path, and each of the body ports 11 and 12 is also surrounded by a continuous groove following another closed rectangular path, the cross groove 52 being common to both paths.

In the open position of FIGS. 1 and 2, the registering piston port and body ports are surrounded by the same continuous groove following a rectangular path, the cross groove 52 being connected to the longitudinal grooves 50 by the body recesses 62. Lubricant can be selectively supplied at all times to the rectangular groove surrounding the registering ports on either side of the piston, through feed tubes 54 which communicate with the longitudinal grooves 50 in all positions of the piston. The lubricant grooves surrounding the ports keep a flow of lubricant toward the ports at all times to counteract any tendency of dirt to work outwardly from ports between metal-to-metal seal between piston and body.

The present construction provides an improved lubricant sealing groove arrangement located entirely in a piston adapted to be laterally to compensate for distortion of the piston and body.

What is claimed is:

1. In a piston valve having a body provided with aligned flow ports, a hollow piston slidable in said body and having an outer peripheral wall and closed end walls forming an internal cavity, an annular wall extending transversely of said piston forming a through port registrable with said flow ports in valve-open position, and said annular wall being internally split longitudinally of said piston into two parts to allow pressure fluid to flow from said through port into said cavity, whereby in the valve-closed position of the piston under pressure the fluid trapped in said cavity acts to conform the peripheral wall of the piston with the body around the flow port on the exhaust side.

2. In a piston valve having a body provided with aligned flow ports, a hollow piston slidable in said body and having an outer peripheral wall and closed end walls forming an internal cavity, an annular wall extending transversely of said piston forming a through port registrable with said flow ports in valve-open position, and said annular wall being internally split longitudinally of said piston into two parts to allow pressure fluid to flow from said through port into said cavity, whereby in the valve-closed position of the piston under pressure the fluid trapped in said cavity acts to conform the peripheral wall of the piston with the body around the flow port on the exhaust side, and means to spread apart said two piston parts to increase the sealing contact between said piston and said body.

3. In a piston valve having a body provided with aligned flow ports, a hollow piston slidable in said body and having an outer peripheral wall and closed end walls forming an internal cavity, an annular wall extending transversely of said piston forming a through port registrable with said flow ports in valve-open position, and said annular wall being internally split longitudinally of said piston into two parts to allow pressure fluid to flow from said through port into said cavity, whereby in the valve-closed position of the piston under pressure the fluid trapped in said cavity acts to conform the peripheral wall of the piston with the body around the flow port on the exhaust side, a wedge plug threadedly engaging said two piston parts, and means accessible from the exterior of said valve to turn said wedge plug to wedge apart said two piston parts.

4. In a piston valve having a body provided with aligned flow ports, a hollow piston slidable in said body and having an outer peripheral wall and closed end walls forming an internal cavity, an annular wall extending transversely of said piston forming a through port registrable with said flow ports in valve-open position, and said annular wall being internally split longitudinally of said piston into two parts to allow pressure fluid to flow from said through port into said cavity, whereby in the valve-closed position of the piston under pressure the fluid trapped in said cavity acts to conform the peripheral wall of the piston with the body around the flow port on the exhaust side, a plug threadedly engaging said two piston parts for wedging them apart, and a stem secured to said plug and extending axially of said piston exteriorly of said body for turning said plug to wedge apart the two piston parts.

5. In a piston valve having a body provided with aligned inlet and outlet ports, a hollow piston slidable in said body and having closed end walls connected by an outer peripheral wall to form an internal cavity, an annular wall extending transversely of said piston between the end walls forming a through port registrable with said inlet and outlet ports in valve-open position, said annular wall being split longitudinally of said piston into two parts to allow pressure fluid to flow from said through port into said cavity, said piston having an external lubricant groove defining a closed path of such extent longitudinally as to surround said body outlet port in both the open and closed positions of said piston, an external cross lubricant groove in said piston adjacent is through port and having its ends spaced from said closed lubricant groove, and lubricant ports in said body for connecting said cross groove ends to said closed lubricant groove in both the open and closed positions of said piston.

6. In a piston valve having a body provided with aligned inlet and outlet ports, a hollow piston slidable in said body and having closed end walls connected by an outer peripheral wall to form an internal cavity, an annular wall extending transversely of said piston between the end walls forming a through port registrable with said inlet and outlet ports in valve-open position, said annular wall being split longitudinally of said piston into two parts to allow pressure fluid to flow from said through port into said cavity, said piston having an external lubricant groove defining a closed path surrounding the said through port and the area covering the body outlet port in the closed position of said piston, an external cross lubricant groove in said piston between said through port and said covering area and having its ends disconnected from said closed lubricant groove, and lubricant ports in said body for connecting said cross groove ends to said closed lubricant groove in both the open end closed positions of said piston.

7. In a piston valve having a body provided with aligned inlet and outlet ports, a hollow piston slidable in said body and having closed end walls connected by an outer peripheral wall to form an internal cavity, an annular wall extending transversely of said piston between the end walls forming a through port registrable with said inlet and outlet ports in valve-open position, said annular wall being split longitudinally of said piston into two parts to allow pressure fluid to flow from said through port into said cavity, said piston having an external lubricant groove defining a closed path having laterally spaced longitudinal portions and surrounding an area including said through port and that portion of said piston which covers the body outlet port in the closed position of said piston, an external cross groove in said piston between said through port and said outlet port covering area and having its ends disconnected from said longitudinal portions of said closed groove, and lubricant ports in said body for connecting said cross groove ends to said longitudinal closed groove portions in both the open and closed positions of said piston.

8. In a valve having a body provided with aligned flow ports, a hollow piston journaled in said body and having an outer peripheral wall and closed end walls forming an internal cavity, an annular wall extending transversely of said piston forming a through port registrable with said flow ports in valve-open position, and said annular wall being internally split longitudinally of said piston into two parts to allow pressure fluid to flow from said through port into said cavity, whereby in the valve-closed position of the piston under pressure the fluid trapped in said cavity acts to conform the peripheral wall of the piston with the body around the flow port on the exhaust side.

References Cited in the file of this patent

UNITED STATES PATENTS

| | | |
|---|---|---|
| 1,153,973 | Tacit | Sept. 21, 1915 |
| 1,596,049 | Kienast | Aug. 17, 1926 |
| 1,780,160 | Leach | Nov. 4, 1930 |
| 1,999,592 | Leach | Apr. 30, 1935 |
| 2,000,494 | Nordstrom | May 7, 1935 |
| 2,011,113 | Neuhaus | Aug. 13, 1935 |
| 2,176,594 | Nordstrom | Oct. 17, 1939 |
| 2,433,638 | Volpin | Dec. 20, 1947 |
| 2,918,935 | Ohls | Dec. 29, 1959 |

UNITED STATES PATENT OFFICE
CERTIFICATE OF CORRECTION

Patent No. 3,004,552　　　　　　　　　　　　　　　October 17, 1961

Homer J. Shafer

It is hereby certified that error appears in the above numbered patent requiring correction and that the said Letters Patent should read as corrected below.

Column 1, line 48, for "other" read -- others --; line 51, strike out "a"; same column 1, line 63, after "on" insert -- lines --; column 2, line 15, for "perssure" read -- pressure --; column 5, line 1, after "laterally" insert -- expanded --; column 6, line 27, for "end" read -- and --.

Signed and sealed this 15th day of May 1962.

(SEAL)
Attest:

ERNEST W. SWIDER　　　　　　　　　　　　　　　DAVID L. LADD
Attesting Officer　　　　　　　　　　　　　　　　Commissioner of Patents